(12) United States Patent
Schneider et al.

(10) Patent No.: US 8,522,621 B2
(45) Date of Patent: Sep. 3, 2013

(54) MEASUREMENT BEARING, IN PARTICULAR FOR A WHEEL SET OF A RAIL VEHICLE

(75) Inventors: Richard Schneider, Löhningen (CH); Armin Luzi, Wiesendangen (CH); Heinz-Dieter Dörner, Nistertal (DE); Jochen Leusch, Matzingen (CH)

(73) Assignee: Bombardier Transportation GmbH, Berlin (DE)

( * ) Notice: Subject to any disclaimer, the term of this patent is extended or adjusted under 35 U.S.C. 154(b) by 96 days.

(21) Appl. No.: 12/935,469

(22) PCT Filed: Mar. 31, 2009

(86) PCT No.: PCT/EP2009/053810
§ 371 (c)(1),
(2), (4) Date: Dec. 21, 2010

(87) PCT Pub. No.: WO2009/121879
PCT Pub. Date: Oct. 8, 2009

(65) Prior Publication Data
US 2011/0100132 A1    May 5, 2011

(30) Foreign Application Priority Data
Mar. 31, 2008    (DE) .......................... 10 2008 016 592

(51) Int. Cl.
*G01L 1/00* (2006.01)
(52) U.S. Cl.
USPC .......................................................... 73/768

(58) Field of Classification Search
USPC ...... 73/768, 593, 862.322, 862.474; 384/448
See application file for complete search history.

(56) References Cited

U.S. PATENT DOCUMENTS

| 4,341,122 | A | 7/1982 | Lechler et al. |
| 6,484,582 | B2* | 11/2002 | Ehrfeld et al. ................. 73/593 |
| 6,490,935 | B1* | 12/2002 | Joki et al. ................. 73/862.49 |
| 6,845,672 | B2* | 1/2005 | Mol et al. ......................... 73/593 |
| 7,241,053 | B2* | 7/2007 | Sato et al. ...................... 384/448 |

FOREIGN PATENT DOCUMENTS

| DE | 102004054201 A1 | 5/2006 |
| EP | 1197415 A2 | 4/2002 |
| GB | 1378685 | 12/1974 |
| WO | 0123862 A1 | 4/2001 |

* cited by examiner

*Primary Examiner* — Lisa Caputo
*Assistant Examiner* — Octavia Davis-Hollington
(74) *Attorney, Agent, or Firm* — The Webb Law Firm

(57) ABSTRACT

A measurement bearing includes a rotational axis and at least one first bearing ring. The first bearing ring defines a main supporting direction and a circumferential direction extending transversally with respect to the main supporting direction. The first bearing ring also has at least one first recess in which a sensor device is arranged. The sensor device is adapted to sense a sensing variable which represents the bearing forces which are applied to the first bearing ring. The first bearing ring further has at least one second recess, in which a further sensor device is arranged. The first recess and the second recess are arranged a distance apart in the circumferential direction and transversally to the circumferential direction.

27 Claims, 2 Drawing Sheets

MEASUREMENT BEARING, IN PARTICULAR FOR A WHEEL SET OF A RAIL VEHICLE

BACKGROUND OF THE INVENTION

1. Field of the Invention

The present invention relates to a measurement bearing, in particular for a wheel set of a rail vehicle, having a rotational axis and at least one first bearing ring. The first bearing ring defines a main supporting direction and a circumferential direction extending transversally with respect to the main supporting direction. The first bearing ring is also designed to take up bearing forces which have at least one force component in the main supporting direction and, during operation, said bearing forces are applied to the first bearing ring via a plurality of rolling bodies. The present invention also relates to a bogie for a rail vehicle with such a measurement bearing. Finally, the invention relates to a method for determining the mechanical loads on a measurement bearing.

2. Description of the Related Art

Roller bearings are used in a large number of different forms to transfer radial and/or axial loads between components rotating in relation to one another. Here, the components of the roller bearing may be subject to various load cases (e.g. static and/or dynamic load, rotating and/or stationary load, etc.) according to the application, for which the bearing must be designed accordingly. It is indeed possible to extensively model the bearing and the expected load cases and to use simulation calculations for the design of such a bearing. The problem remains, however, that for the expected load cases a certain simplification must necessarily be applied. Difficulties also arise in taking account of production and assembly tolerances in such model calculations.

It is also known for the actual load cases affecting a bearing during operation to be estimated by analysis of the contact pattern or the deterioration pattern of a worn bearing. Here again, however, it is difficult to draw any conclusions about the actual load situation during operation.

The abovementioned models of the roller bearing are also used, inter alia, in methods for identification of the (deterioration) state of a roller bearing of this type. For example, such a method is known from EP 1 197 415 B1. Here, dynamic measurements (via acceleration sensors) in the area of a bearing are used to draw conclusions about its level of deterioration by means of modelling the bearing.

Through a later analysis of the measured bearing a further refinement of the model can indeed take place. But the problem remains that only secondary information on the actual loads on the bearing can be obtained.

Wheel set bearings of rail vehicles are as a rule subject to comparatively high loads, whilst at the same time for such wheel set bearings a long service life is demanded. This applies in particular to the wheel set bearings of high speed vehicles. Despite comparatively great efforts in the design of wheel set bearings and high quality of manufacture, from time to time damage is observed, the causes of which are unclear.

SUMMARY OF THE INVENTION

The object of the present invention is therefore to provide a measurement bearing or a method of the type described at the beginning, which overcomes the above disadvantages and, in particular, with a simple design allows a reliable measurement of the actual loads on the bearing.

The present invention is based on the technical teaching that with a simple design a reliable measurement of the actual loads on the bearing is possible if a recess is made in a bearing ring of the bearing, in which a corresponding sensor device (with one or more sensors or the like) is arranged, in order to sense, during operation of the bearing, preferably, in real time, one or more sensing variables which is or are representative of the loads acting on the bearing in this area.

It has turned out that such an arrangement, in particular such a recess, can be created in such a way that in this way no appreciable weakening of the bearing, in particular, no appreciable reduction of the rigidity of the bearing, results. Therefore, the measurement bearing can at the same time be designed in such a way that its mechanical characteristics at least substantially correspond to those of a conventional bearing (as intended for the application concerned). Accordingly, from the measurements on the measurement bearing, highly accurate conclusions can be drawn about the actual load situation of the conventional bearing during operation. The measurements on the measurement bearing can thus be used in an advantageous manner for the design of such a conventional bearing in order to optimise its design.

According to one aspect of the invention for this purpose a measurement bearing is provided, in particular for a wheel set of a rail vehicle, having a rotating axis and at least one first bearing ring. The first bearing ring defines a main supporting direction and a circumferential direction extending transversally with respect to the main supporting direction. The first bearing ring is also designed to take up bearing forces which have at least one force component in the main supporting direction and during operation said bearing forces are applied to the first bearing ring via a plurality of rolling bodies. The first bearing ring has at least one first recess in which a sensor device is arranged, wherein the sensor device is designed to sense a sensing variable which represents the bearing forces which are applied to the bearing ring.

Here, the main supporting direction of the bearing designates the direction in which, according to its purpose, the bearing predominantly has to take up forces. For a purely radial bearing the main supporting direction is the radial direction of the bearing, while for a purely axial bearing the axial direction of the bearing represents the main supporting direction. In mixed types (for example tapered roller bearings, barrel-shaped roller bearings, etc.) the main supporting direction can, if necessary, have an appropriate inclination towards the radial direction or the axial direction. In rolling bodies with shell surfaces, which run linearly in a section (containing the rolling body axis), the main supporting direction is generally defined by a surface normal on the running surface of the rolling bodies (assigned to the bearing ring concerned).

The first recess can basically be arranged at any suitable point in the first bearing ring. Preferably the first recess is arranged in the contact area of the first bearing ring, i.e. the area of the first bearing ring which mainly takes up the loads during operation of the bearing. As a rule, this contact area lies in the projection of the rolling bodies in the main supporting direction. Preferably, the first recess is therefore arranged in the area of a projection of a movement area of the rolling bodies along the main supporting direction, wherein the movement area of the rolling bodies corresponds to the toroid defined by the rolling bodies rotating around the axis of rotation during operation.

In order to guarantee ease of access to the first recess, in particular to allow ease of fitting of the sensor device, the recess is preferably open to one side of the bearing ring. Here it is preferably a case of the side of the first bearing ring not turned towards the running surface of the rolling bodies. Preferably the first recess is open to the side of the first bearing ring turned away from the rolling bodies, since in this way easy positioning of the sensor device at any point in the bearing ring is possible, without a large recess in the first bearing ring being necessary with the associated weakening of the first bearing ring.

Depending on the application it may basically be sufficient to provide the first recess with the first sensor device as a single recess in the first bearing ring. Preferably, however, at least a second sensor device is arranged in the first bearing ring, in order to achieve a greater spatial resolution when considering the actual loads in the bearing. Preferred variants of the measurement bearing according to the invention are accordingly characterised in that the first bearing ring has at least one second recess, in which a further sensor device is arranged, wherein the further sensor device is designed to sense a sensing variable which represents the bearing forces which are applied to the bearing ring.

It shall be understood here that in addition to these two sensor devices, further sensor devices may also be provided in order to increase the spatial resolution of the measurement. It must be ensured here, however, that the mechanical weakening of the bearing caused by the additional recesses, in particular the associated reduction in rigidity, still remains within a tolerable limit in order to allow reliable statements to be made on the actual load conditions during operation of a conventional bearing.

In order to keep the localised weakening of the first bearing ring in the area of the respective recess as low as possible, the first recess and the second recess are an appropriate distance apart. Preferably, it is then provided that the first recess and the second recess are arranged a distance apart in the circumferential direction and/or transversally to the circumferential direction.

Preferably, the first recess and the second recess are arranged a distance apart in the circumferential direction by a first circumferential angle $\alpha_1$, wherein the rolling bodies during operation define a division which corresponds to a second circumferential angle $\alpha_2$, and the first circumferential angle $\alpha_1$ is greater than the second circumferential angle $\alpha_2$. Here, with N being the number of rolling bodies, the second circumferential angle $\alpha_2$ is calculated according to:

$$\alpha_2 = \frac{360°}{N}, \quad (1)$$

Preferably, the first circumferential angle $\alpha_1$ is at least 110% of the second circumferential angle $\alpha_2$, preferably at least 130% of the circumferential angle, more preferably at least 150% of the second circumferential angle, since, in this way, a particularly favourable arrangement of the sensor devices with a simultaneous lower weakening of the first bearing ring is possible. In this connection it should be noted that a small distance between two recesses with regard to transmission of the sensor signals over a short path (for example over appropriate signal lines) to the outside of the bearing ring is an advantage.

In further preferred variants of the measurement bearing according to the invention, the first recess and the second recess are arranged in the area of a projection of a movement area of the rolling bodies along the main supporting direction, wherein the first recess and the second recess are arranged a transversal distance apart from one another in a spacing direction running transversally to the circumferential direction. The movement area of the rolling bodies again corresponds to the toroid that is defined by the rolling bodies rotating around the axis of rotation during operation. This movement area has a transversal dimension b in the spacing direction. The transversal spacing a is 30% to 70% of the transversal dimension b, preferably 40% to 60% of the transversal dimension b, more preferably 45% to 55% of the transversal dimension b.

In this connection it should be noted that a small distance of the two recesses (in the transversal direction and in the circumferential direction) with regard to transmission of the sensor signals over a short path (for example over appropriate signal lines) to the outside of the bearing ring is an advantage.

In order to achieve the lowest possible weakening of the measurement bearing compared to a corresponding conventional bearing, the depth of the respective recess is also preferably limited appropriately. Preferably, it is provided that the first recess has a depth dimension t in the main supporting direction and that the first bearing ring has a thickness dimension d in the main supporting direction, wherein the depth dimension t is 30% to 70% of the thickness dimension d, preferably 40% to 60% of the thickness dimension d, more preferably 45% to 55% of the thickness dimension d.

The forwarding or the transmission, respectively, of the measurement signals of the sensor device from the bearing ring to an appropriate processing unit can basically take place in any suitable manner. In particular, the transmission of the measurement signals can take place completely or partially wirelessly. In preferred variants, because these are of a particularly simple design, at least one duct opening into the first recess is provided, designed to lead signal lines connected with the first sensor device to the outside of the first bearing ring.

The duct can be created in any suitable manner. In particular, in the first bearing ring a suitable drill hole can be provided which opens into the first recess. A particularly simple to manufacture variant of the measurement bearing according to the invention is characterised in that in the first bearing ring at least one first groove running in the circumferential direction and opening into the first recess is provided. Preferably then in addition at least one second groove running transversally to the circumferential direction is provided which opens into the first groove, in order, for example, via this, to lead signal lines connected with the sensor device to the outside of the first bearing ring.

Here again, in order to achieve the lowest possible localised weakening of the first bearing ring, it is preferably provided that the first recess and the second groove are arranged a distance apart in the circumferential direction by a third circumferential angle $\alpha_3$, the rolling bodies (in the manner already described above) during operation define a division which corresponds to a second circumferential angle $\alpha_2$, and the third circumferential angle $\alpha_3$ is greater than the second circumferential angle $\alpha_2$. Here again it is preferably provided that the third circumferential angle $\alpha_3$ is at least 110% of the second circumferential angle $\alpha_2$, preferably at least 130% of the second circumferential angle $\alpha_2$, more preferably at least 150% of the second circumferential angle $\alpha_2$.

In this connection it should again be noted that a small distance between the second groove and the two recesses (in the circumferential direction) with regard to transmission of the sensor signals over a short path (for example over appropriate signal lines) to the outside of the bearing ring is an advantage.

As mentioned, the invention can be used for any kind of bearings. It can be particularly easily and advantageously used in connection with radial bearings. Preferably the first bearing ring therefore defines a radial direction and the main supporting direction corresponds to this radial direction. The invention can be used particularly advantageously also in configurations with a plurality of bearing rings arranged next to one another. Preferably the first bearing ring defines an axial direction and, in the axial direction, a second bearing ring is provided alongside. Here, the two bearing rings must not be directly adjoining one another. Rather, between the first bearing ring and the second bearing ring an intermediate ring can be arranged.

A particularly advantageous configuration with regard to the measurements to be performed results if the second bearing ring with reference to a plane of symmetry running perpendicular to the axial direction is designed to be symmetrical with the first bearing ring.

The present invention can be used for any types of roller bearings, for example, for ball bearings, barrel-shaped roller bearings or needle roller bearings. Particular ease of use is achieved with cylindrical roller bearings or tapered roller bearings. Furthermore, the measurement can be carried out at any point in the bearing. Here, the location of the measurement is typically determined by the type of load on the bearing (stationary load or rotating load). Here, it is of particular interest to perform the measurements on the bearing ring that is subject to a rotating load. Here, in the case of a radial bearing, the latter can be an external ring or also an internal ring of the radial bearing. In the case of a wheel set bearing the first bearing ring therefore typically forms an inner ring of the measurement bearing. Furthermore, the first bearing ring in this case preferably forms a bearing ring of the measurement bearing that rotates during operation.

The sensor device can basically have any suitable design, in order to sense the sensing variables representing the load on the bearing ring. Because of its particularly simple construction and its ease of handling it is preferably provided that the first sensor device comprises at least one strain gauge connected with the first bearing ring. Preferably, at least two strain gauges are provided, which are preferably arranged diametrically opposed to each other in the first recess, so that two measuring planes can be created in a simple manner with a single recess.

Here, essentially any alignment of the strain gauges is possible. Because of the rotational movement, however, it is preferably provided that at least one strain gauge is essentially aligned in the circumferential direction.

The transmission of the measurement signals from the sensor device to a processing unit for further processing can basically take place in any suitable manner. Preferably, at least in sections, wireless transmission is provided. It is therefore preferably provided that the first sensor device is connected with a transmitter of a telemetry device.

The present invention further relates to a rail vehicle with a measurement bearing according to one of the preceding claims. This allows the variants and advantages previously described to be achieved to the same degree so that in this connection reference is made to the above statements.

Furthermore, the present invention relates to a method for determining the mechanical loads on a measurement bearing, in particular for a wheel set of a rail vehicle, in which a measurement bearing is used having a rotational axis and at least one first bearing ring. The first bearing ring defines a main supporting direction and a circumferential direction extending transversally with respect to the main supporting direction. Furthermore, the first bearing ring is designed to take up bearing forces which have at least one force component in the main supporting direction, and, during operation, said bearing forces are applied to the first bearing ring via a plurality of rolling bodies. By means of a first sensor device, during operation, a sensing variable which represents the bearing forces which are applied to the bearing ring is sensed and output in the form of first measurement signals, wherein the sensor device is arranged in a first recess of the first bearing ring. The first measurement signals from the first sensor device are then used to determine the mechanical loads. This likewise allows the variants and advantages previously described to be achieved to the same degree so that in this connection reference is made to the above statements.

BRIEF DESCRIPTION OF THE DRAWINGS

Further preferred embodiments of the invention can be inferred from the dependent claims or from the description below of preferred embodiments, which makes reference to the attached drawings. It is shown in:

DETAILED DESCRIPTION OF THE PREFERRED EMBODIMENTS

First Embodiment

In the following, by reference to FIGS. 1 to 3, initially a first preferred embodiment of the measurement bearing 101 according to the invention is described which is used in a preferred embodiment of the rail vehicle 102 according to the invention.

Figure 3:
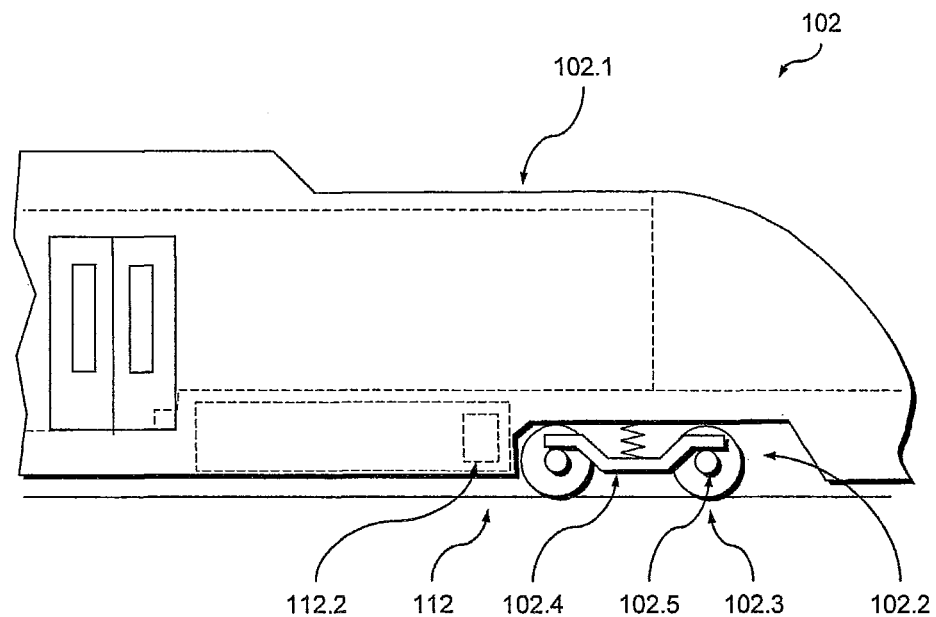
FIG. 3 a schematic side view of part of the rail vehicle according to the invention with the measurement bearing from FIGS. 1 and 2.

As can be inferred from FIG. 3, the rail vehicle 102 has a body 102.1, supported by a bogie 102.2. The bogie 102.2 comprises two wheel sets 102.3, on which the bogie frame 102.4 is supported by wheel set bearing devices 102.5. Each wheel set bearing device 102.5 comprises a measurement bearing 101 with an inner part 101.1, which rests on the axle shaft (not shown) of the wheel set 102.3, while its outer part (not shown) rests in the wheel set bearing housing (not shown) of the wheel set bearing device 102.5.

The measurement bearing 101 is in the form of a cylindrical roller bearing and has three parts, its form being mirror-symmetrical to a plane of symmetry 101.2. Here the measurement bearing comprises a first part 101.3, a second part 101.4 and a third part 101.5.

The first part 101.3 of the measurement bearing 101 comprises a first bearing ring in the form of an inner ring 103. The first part 101.3 of the measurement bearing 101 also comprises a plurality of N roller bodies in the form of cylindrical rollers 104, which run on a bearing surface 103.1 of the inner ring 103. Via the cylindrical rollers 104 inter alia the corresponding proportion of the weight of the body 102.1 is supported in a main supporting direction, here, the radial direction R of the measurement bearing 101 (z direction in FIG. 1).

The inner ring 103, on its inside turned towards the axle shaft, has a first recess pointing in the radial direction in the form of a first blind hole 105 and second recess pointing in the radial direction in the form of a second blind hole 106.

Furthermore, the inner ring 103, on its inside, has a first groove 107 running in its circumferential direction, which opens into the first recess 105. It similarly has a second groove 108 running in its circumferential direction U, which opens into the second recess 106. The two grooves 107 and 108 are connected together via a third groove 109 running obliquely to the circumferential direction U. The third groove 109, in the axial direction of the measurement bearing 101 (y direction in FIG. 1), extends completely through the inner ring 103.

In the first recess 105 a first sensor device 110 is arranged while in the second recess 106 a second sensor device 111 is arranged. The first sensor device 110 and the second sensor device 111 each comprise two strain gauges, arranged diametrically opposed to one another, so that in each case they are aligned essentially in the circumferential direction U of the inner ring 103.

The strain gauges 110.1, 110.2 of the first sensor device 110 are connected via first signal lines (for example, enamelled copper wires) with a transmitter 112.1 of a telemetry device 112, which rests on the axle shaft (not shown). The first signal lines here are led in the first groove 107 as far as up to the third groove 109 and then via the third groove 109 out of the inner ring 103 to the transmitter 112.1 (as shown in FIG. 2 by way of example but for clarity only in full for the strain gauge 110.1).

The strain gauges of the second sensor device 111 are connected via second signal lines (for example, enamelled copper wires) with the transmitter 112.1. Here, the second signal lines are run in the second groove 108 as far as up to the third groove 109 and then via the third groove 109 likewise out of the inner ring 103 to the transmitter 112.1 (as shown in FIG. 2 by way of example but for clarity only for one of the two wire strain gauges).

The sensor devices 110 and 111 deliver signals in a sufficiently known manner through the voltage changes resulting from the deformations (serving as sensing variables) of the strain gauges, which represent the loads acting on the inner ring 103 at the respective measuring point. Here, the sensor devices 110 and 111, depending on the available sampling rate, provide real time data on the current loads on the measurement bearing. In the present example very high time resolutions are achieved so that in relation to the angle of rotation of the measurement bearing 101 an angular resolution of up to 1° can be achieved.

The transmitter 112.1 sends the measurement signals from the sensor devices 110 and 111 to a processing unit 112.2 of the telemetry device 112, which provides appropriate further processing of the signals from the sensor devices 110 and 111 and from this delivers the actual loads on the measurement bearing 101.

Figure 1:
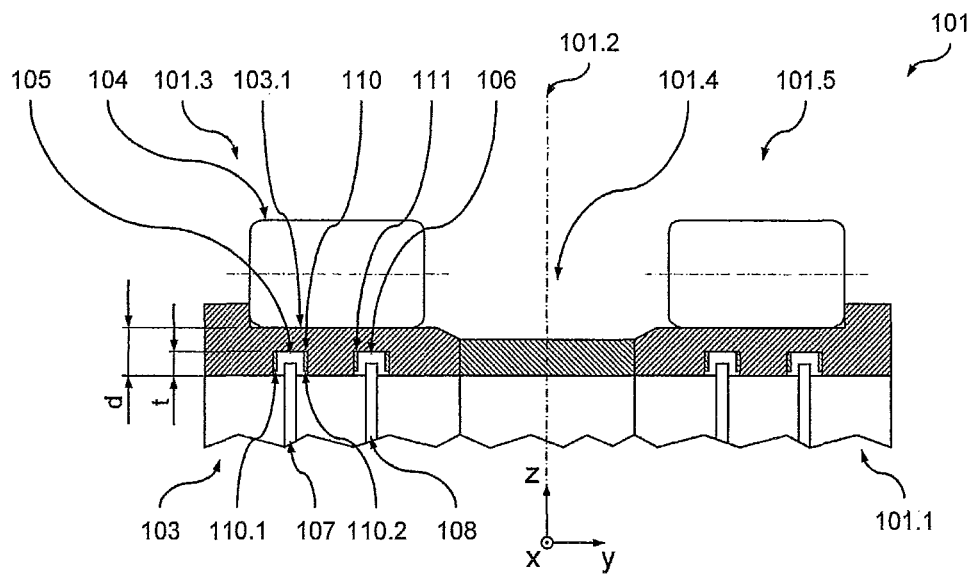
FIG. 1 a schematic sectional view of part of a preferred embodiment of the measurement bearing (along line I-I from FIG. 2)
Figure 2:
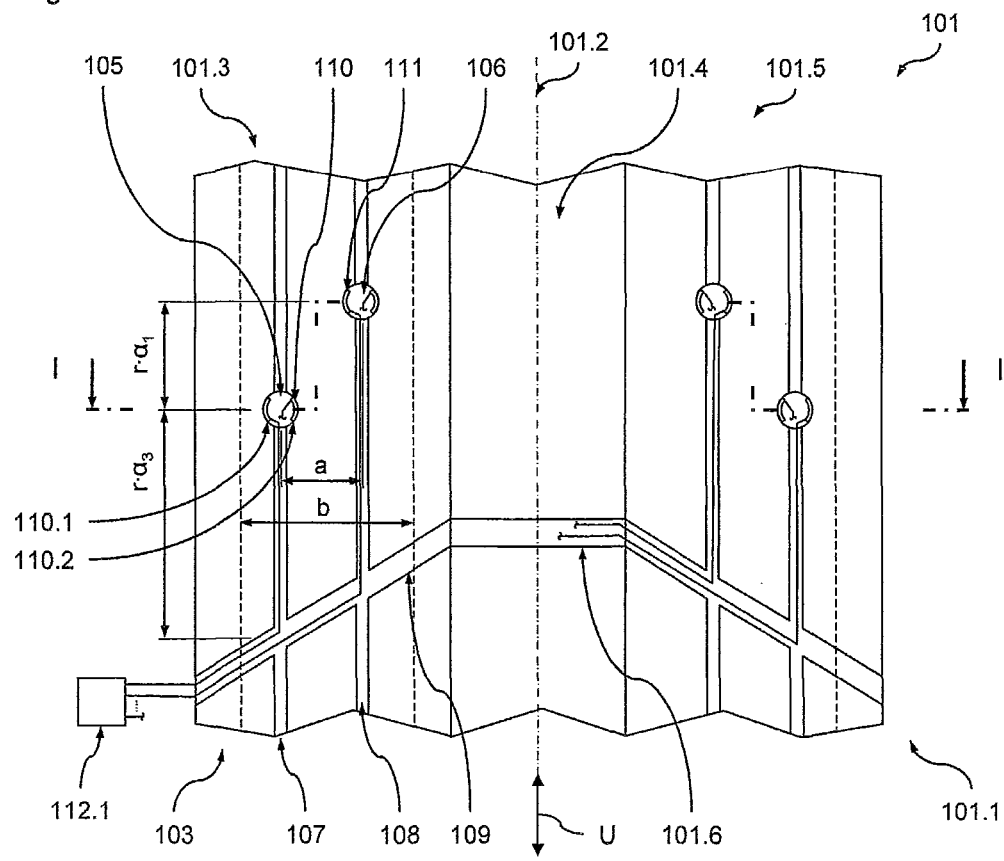
FIG. 2 a top view of a development of the measurement bearing from FIG. 1.

As mentioned, the third bearing part 101.5 has a design that is symmetrical with the first bearing part 101.3 and has the same number of sensor devices or strain gauges, which are likewise connected via a groove 101.6 (connecting the two third grooves 109 of the first bearing part 101.3 and the third bearing part 101.5) running in the axial direction (y direction in FIG. 1) with the transmitter device 112.1 (as shown in FIG. 2, but in an incomplete manner for clarity).

The spatial resolution of the measurement is therefore defined by the four measuring planes in each case, aligned perpendicularly to the axial direction (y-direction in FIG. 1) in the first and third bearing parts 101.3, 101.5, which are defined by the four strain gauges of the two sensor devices 110 and 111 in the first bearing part 101.3 and the four strain gauges of the two sensor devices in the third bearing part 101.5. This means, therefore, that there are eight such measuring planes defined in the measurement bearing 101.

It will be understood here that, with other variants of the invention, other numbers of measuring planes can also be defined, for example by providing further recesses with further sensor devices (each with one or more strain gauges). It will also be understood that a different number of strain gauges may be provided in the each of the first and second recesses.

The recesses 105, 106 and the grooves 107, 108 are designed in such a way that the annular cross-section of the inner ring 103 is weakened only very minimally so that there is only an insignificant change to the high rigidity of the bearing 101. Thus, there is total comparability with unmodified serial production bearings.

In order to keep the localised weakening of the first bearing ring in the area of the respective recess as low as possible, and to maintain sufficient coverage of the loaded area of the measurement bearing 101 by the measurement, the first recess 105 and the second recess 106 are spaced an appropriate distance apart in the circumferential direction and transversally to the circumferential direction.

Thus the first recess 105 and the second recess 106 are arranged a distance apart in the circumferential direction by a first circumferential angle $\alpha_1$ (as shown in the case from FIG. 2 by the length $r \cdot \alpha_1$, where r is the internal radius of the inner ring 103), corresponding to 150% of the circumferential angle $\alpha_2$. The second circumferential angle $\alpha_2$ is defined by the division of the cylindrical rollers 104 and again is calculated using the above equation (1), that is:

$$\alpha_2 = \frac{360°}{N}.$$

This allows a particularly advantageous arrangement of the sensor devices 110, 111 and, at the same time, a low weakening of the first bearing ring 103. In this connection it should be noted that a small distance between two recesses 105, 106 with regard to transmission of the sensor signals over a short path (for example over appropriate signal lines) to the outside of the bearing ring 103 is an advantage.

As can be inferred from FIGS. 1 and 2, the first recess 105 and the second recess 106 are arranged in the area of a projection of a movement area of the cylindrical rollers 104 in the main supporting direction, i.e. in the radial direction R. Here, the first recess 105 and the second recess 106 are spaced apart in a spacing direction running transversally to the circumferential direction U (y direction in FIG. 1) by transversal spacing a.

The movement area of the rolling bodies again corresponds to the toroid that is defined by the cylindrical rollers 104 rotating around the axis of rotation of the measurement bearing 101 during operation. This movement area has a transversal dimension b in the spacing direction. The transversal spacing a of the first and second recesses 105, 106 is approximately 50% of the transversal dimension b.

In this connection it should again be noted that a small distance between the two recesses 105, 106 (in the transversal direction and in the circumferential direction) with regard to transmission of the sensor signals over a short path (for example over appropriate signal lines) to the outside of the bearing ring 103 is an advantage.

In order to achieve the lowest possible mechanical weakening of the measurement bearing compared with a conventional bearing, the depth of the respective recess 105, 106 is also limited. To this end, the first recess 105 and the second recess 106, in the main supporting direction (z direction in FIG. 1), have a depth dimension t, wherein the depth dimension t is approximately 50% of the thickness dimension d of the bearing ring 103.

In order to also achieve the lowest possible localised weakening of the first bearing ring 103, the first recess 105 and the third groove 109 are arranged spaced apart in the circumferential direction U by a third circumferential angle $\alpha_3$ (as shown in the case of FIG. 2 by the length $r \cdot \alpha_3$), which is 150% of the second circumferential angle $\alpha_2$.

Thanks to the total number of measuring planes, from the strain gauges of which the signals are simultaneously recorded, by means of bearing force measurements over the respective circumference in each case a measurement of the load zones is obtained. For the purposes of evaluation the measurement data from each measured area can be "rotated back" to a reference angle by the processing unit 112.2.

In a further embodiment, grooves with strain gauges can be arranged on the rear wall of the bearing 101 in order to (also) sense the longitudinal forces on the bearing 101.

Second Embodiment

Figure 4:
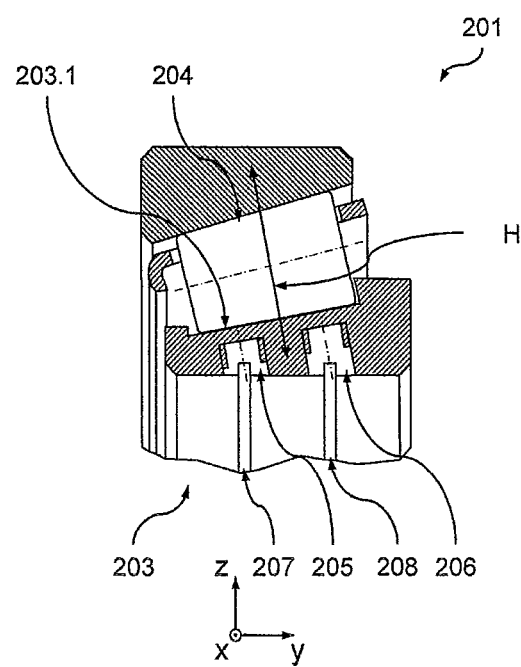
FIG. 4 a schematic sectional view of part of a further preferred embodiment of the measurement bearing according to the invention.

In the following, with reference to FIG. 4, a further preferred embodiment of the measurement bearing 201 according to the invention is described. In terms of its structure and functionality the measurement bearing 201 essentially corresponds to measurement bearing 101, so that here only the differences will be looked into. In particular, like components will be given reference numbers that have been increased by a value of 100. Where in the following no differing description is provided, reference is made to the statements above concerning the first embodiment with respect to these components.

The only difference from measurement bearing 101 from FIG. 1 is that the measurement bearing 201 is not designed as a cylindrical roller bearing but as a tapered roller bearing. Here, the first recess 205 and the second recess 206 (with the respective annular channel 207 or 208 and the respective sensor devices 210 or 211) are arranged in such a way that their longitudinal axes run parallel to the main supporting direction H, which is aligned perpendicularly to the running surface 203.1 of the cylindrical roller 204 on the inner ring 203.

The present invention has been described above using examples in which the sensor devices are arranged in the inner ring of the measurement bearing. It shall be understood, however, that, in other variants of the invention, additionally or alternatively sensor devices can also be arranged in the outer ring of the measurement bearing.

Furthermore, the present invention has been described solely using examples in which the measurement bearing is designed as a radial bearing. It will be understood, however, that the invention can also be used with axial bearings.

Finally, it will be understood that the invention can be used not only in connection with the wheel set bearings of rail vehicles, but also for any other applications in which the most accurate possible determination of the actual loads on a bearing is desired and advantageous. In particular, the invention can be used for any other types of vehicle (such as land, air and water vehicles), any mobile and stationary systems, for example wind powered systems, and so on.

The invention claimed is:

1. A measurement bearing comprising:
    a rotational axis and at least one first bearing ring, wherein the first bearing ring defines a main supporting direction and a circumferential direction extending transversally with respect to the main supporting direction, and the first bearing ring is designed to take up bearing forces which have at least one force component in the main supporting direction and, during operation, said bearing forces are applied to the first bearing ring via a plurality of rolling bodies,
    wherein
    the first bearing ring has at least one first recess in which a sensor device is arranged, the sensor device is designed to sense a sensing variable which represents the bearing forces which are applied to the first bearing ring,
    the first recess is arranged in the area of a projection of a movement area of the rolling bodies along the main supporting direction, wherein the movement area of the rolling bodies corresponds to the toroid defined by the rolling bodies rotating around the axis of rotation during operation, and
    the first bearing ring has at least one second recess, in which a further sensor device is arranged, wherein the further sensor device is designed to sense a sensing variable which represents the bearing forces which are applied to the bearing ring,
    the first recess and the second recess are arranged a distance apart in the circumferential direction and transversally to the circumferential direction.

2. The measurement bearing according to claim 1, wherein the first recess is open to the side of the first bearing ring turned away from the rolling bodies.

3. The measurement bearing according to claim 1, wherein
    the first recess and the second recess are arranged a distance apart in the circumferential direction by a first circumferential angle,
    the rolling bodies during operation define a division which corresponds to a second circumferential angle, and
    the first circumferential angle is greater than the second circumferential angle.

4. The measurement bearing according to claim 3, wherein the first circumferential angle is at least 110% of the second circumferential angle.

5. The measurement bearing according to claim 1, wherein
    the first recess and the second recess are arranged in the area of a projection of a movement area of the rolling bodies along the main supporting direction, wherein
    the first recess and the second recess are arranged a transversal distance apart from one another in a spacing direction running transversally to the circumferential direction,
    the movement area of the rolling bodies corresponds to a toroid that is defined by the rolling bodies rotating around the axis of rotation during operation, and has a transversal dimension in the spacing direction, and
    the transversal spacing is 30% to 70% of the transversal dimension.

6. The measurement bearing according to claim 1, wherein
    the first recess has a depth dimension in the main supporting direction and
    the first bearing ring has a thickness dimension in the main supporting direction, wherein
    the depth dimension is 30% to 70% of the thickness dimension.

7. The measurement bearing according to claim 1, further comprising at least one duct opening into the first recess designed to lead signal lines connected with the first sensor device to the outside of the first bearing ring.

8. The measurement bearing according to claim 1, wherein the first bearing ring comprises at least one first groove running in the circumferential direction and opening into the first recess.

9. The measurement bearing according to claim 8, further comprising at least one further groove running transversally to the circumferential direction which opens into the first groove.

10. The measurement bearing according to claim 9, wherein
the first recess and the further groove are arranged a distance apart in the circumferential direction by a third circumferential angle,
the rolling bodies during operation define a division which corresponds to a second circumferential angle, and
the third circumferential angle is greater than the second circumferential angle, wherein
the third circumferential angle is at least 110% of the second circumferential angle.

11. The measurement bearing according to claim 1, wherein the first bearing ring defines a radial direction and the main supporting direction corresponds to the radial direction.

12. The measurement bearing according to claim 11, wherein
the first bearing ring defines an axial direction and, in the axial direction, a second bearing ring is provided alongside, wherein,
between the first bearing ring and the second bearing ring an intermediate ring is arranged.

13. The measurement bearing according to claim 12, wherein the second bearing ring, with reference to a plane of symmetry running perpendicularly to the axial direction, is designed to be symmetrical with the first bearing ring.

14. The measurement bearing according to claim 1, comprising the form of a cylindrical roller bearing or a tapered roller bearing.

15. The measurement bearing according to claim 1, wherein the first bearing ring forms an inner ring of the measurement bearing.

16. The measurement bearing according to claim 1, wherein the first bearing ring forms a bearing ring of the measurement bearing that rotates during operation.

17. The measurement bearing according to claim 1, wherein the first sensor device comprises at least one strain gauge connected with the first bearing ring.

18. The measurement bearing according to claim 17, wherein the first sensor device comprises two strain gauges which are arranged diametrically opposed to each other in the first recess.

19. The measurement bearing according to claim 17, wherein the at least one strain gauge is essentially aligned in the circumferential direction.

20. The measurement bearing according to claim 1, wherein the first sensor device is connected with a transmitter of a telemetry device.

21. A rail vehicle with a measurement bearing according to claim 1.

22. A method for determining the mechanical loads on a measurement bearing in which a measurement bearing is used having
a rotational axis and at least one first bearing ring, wherein
the first bearing ring defines a main supporting direction and a circumferential direction extending transversally with respect to the main supporting direction,
the first bearing ring is designed to take up bearing forces which have at least one force component in the main supporting direction, and during, operation said bearing forces are applied to the first bearing ring via a plurality of rolling bodies, wherein
by means of a first sensor device, during operation, a sensing variable which represents the bearing forces which are applied to the bearing ring is sensed and output in the form of first measurement signals, wherein the first sensor device is arranged in a first recess of the first bearing ring, and
by means of a second sensor device, during operation, a sensing variable which represents the bearing forces which are applied to the bearing ring is sensed and output in the form of second measurement signals, wherein the second sensor device is arranged in a second recess of the first bearing ring, and
the first measurement signals from the first sensor device and the second measurement signals from the second sensor device are used to determine the mechanical loads; and
the first recess and the second recess are arranged a distance apart in the circumferential direction and transversally to the circumferential direction.

23. The method according to claim 22, wherein
the first bearing ring defines an axial direction and a second bearing ring is provided in the axial direction alongside it, and
by means of at least a third sensor device, during operation, a sensing variable which represents the bearing forces which are applied to the second bearing ring is sensed and output in the form of third measurement signals, wherein the third sensor device is arranged in a second recess of the second bearing ring, and
the third measurement signals from the third sensor device are used to determine the mechanical loads.

24. The method according to claim 22, wherein the first sensor device comprises at least a strain gauge connected with the first bearing ring.

25. The method according to claim 24, wherein the first sensor device comprises two strain gauges, which are arranged in the first recess diametrically opposed to one another and generate the first measurement signals.

26. The method according to claim 24, wherein the at least one strain gauge is aligned essentially in the circumferential direction.

27. The method according to claim 22, wherein the first measurement signals of the first sensor device are sent via a transmitter of a telemetry device to an evaluation unit of the telemetry device.

* * * * *

UNITED STATES PATENT AND TRADEMARK OFFICE
CERTIFICATE OF CORRECTION

PATENT NO.        : 8,522,621 B2                                              Page 1 of 1
APPLICATION NO.   : 12/935469
DATED             : September 3, 2013
INVENTOR(S)       : Schneider et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 179 days.

Signed and Sealed this
Fifteenth Day of September, 2015

Michelle K. Lee
*Director of the United States Patent and Trademark Office*